O. A. KLINGELHOFER.
DISPLAY APPARATUS.
APPLICATION FILED JULY 21, 1914.
1,189,137.
Patented June 27, 1916.
3 SHEETS—SHEET 1.
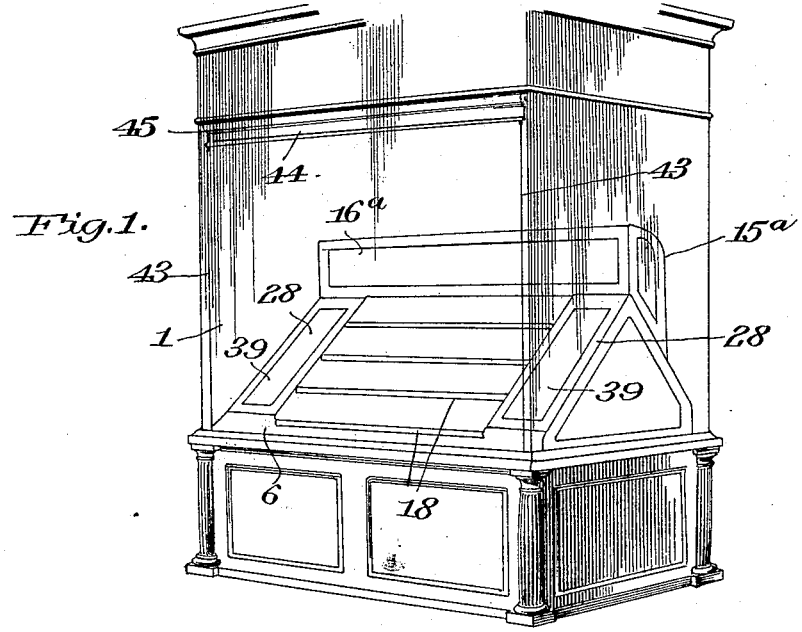
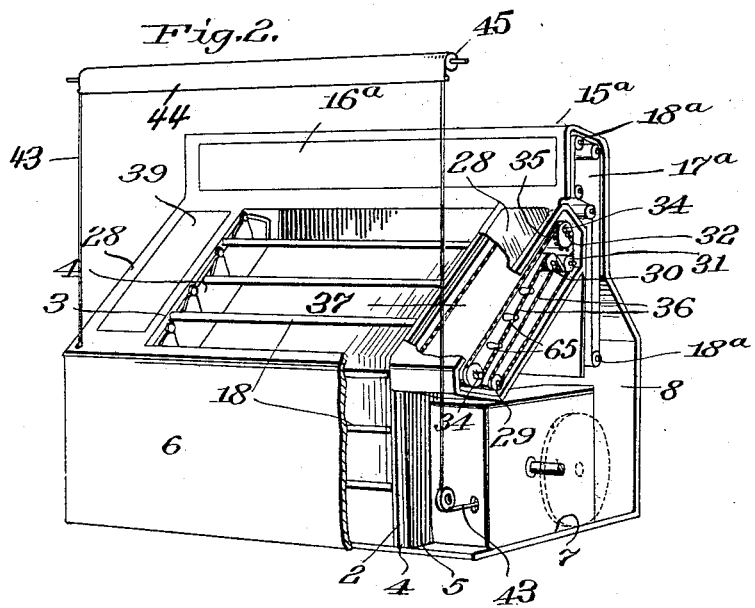
Witnesses
Inventor
Otto A. Klingelhofer,
By Victor J. Evans
Attorney O. A. KLINGELHOFER.
DISPLAY APPARATUS.
APPLICATION FILED JULY 21, 1914.
1,189,137.
Patented June 27, 1916.
3 SHEETS—SHEET 2.
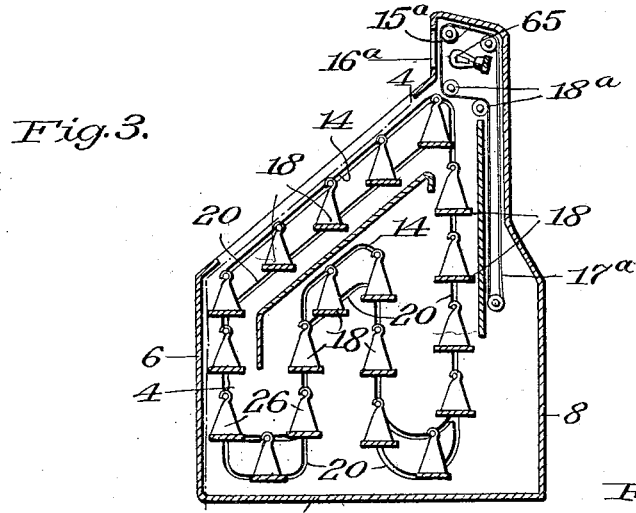
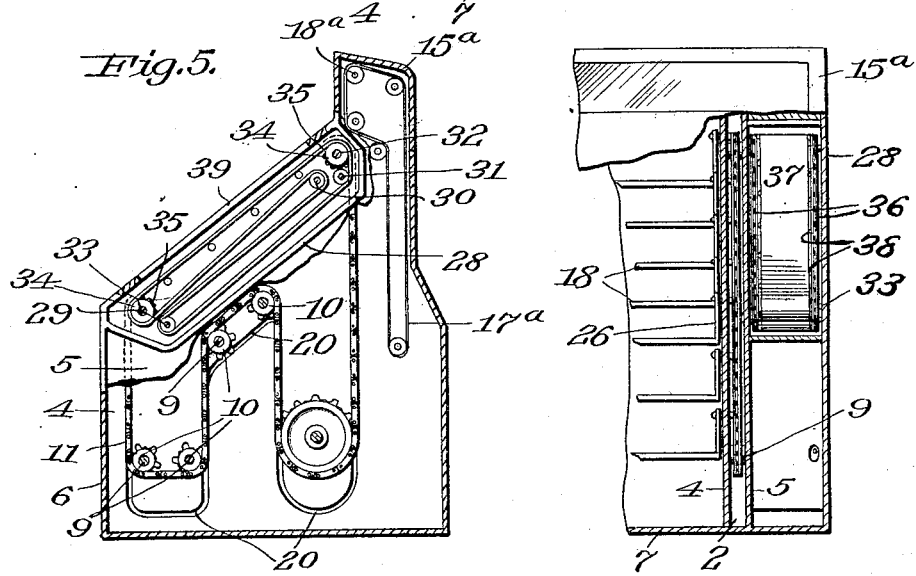
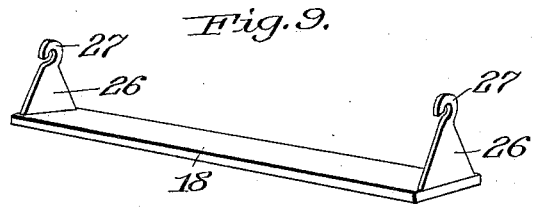
Inventor
Otto A. Klingelhofer;
By Victor J. Evans
Attorney
Witnesses

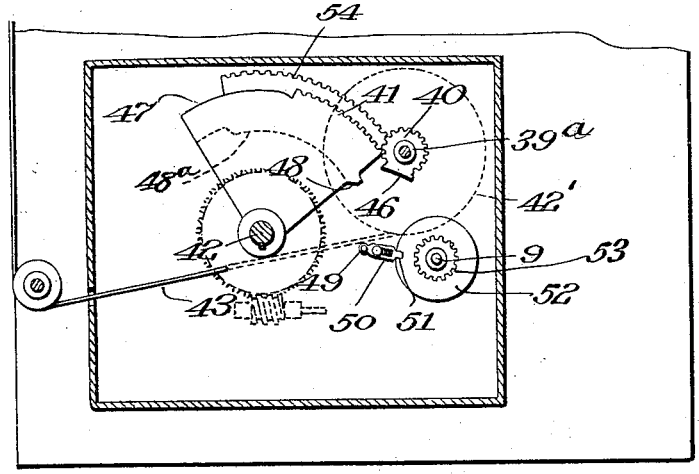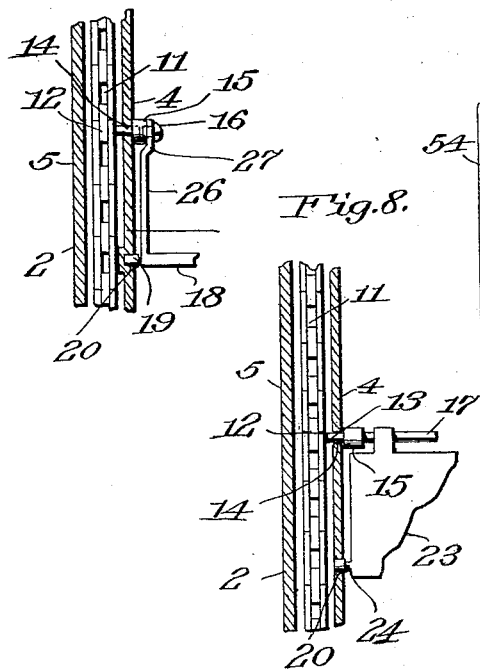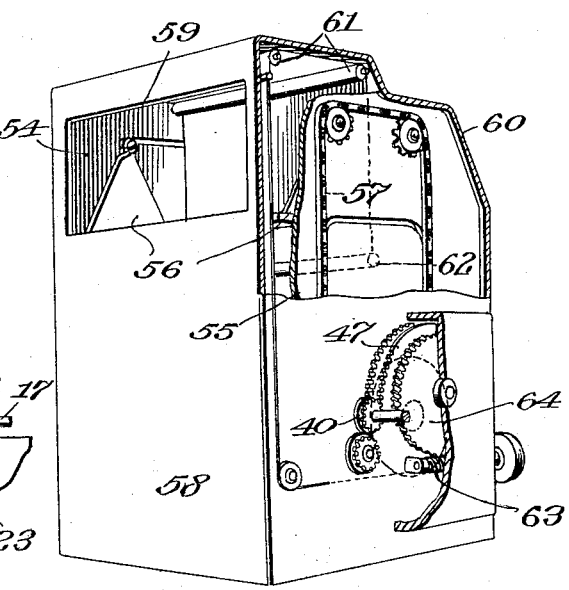

UNITED STATES PATENT OFFICE.

OTTO A. KLINGELHOFER, OF CHICAGO, ILLINOIS.

DISPLAY APPARATUS.

1,189,137.  Specification of Letters Patent.  Patented June 27, 1916.

Application filed July 21, 1914. Serial No. 852,242.

*To all whom it may concern:*

Be it known that I, OTTO A. KLINGELHOFER, a citizen of the United States, residing at Chicago, in the county of Cook and State of Illinois, have invented new and useful Improvements in Display Apparatus, of which the following is a specification.

This invention relates to display apparatus and more particularly to that class of devices known in the art as changeable display devices.

One of the principal objects of the invention is to provide simple and efficient mechanism for intermittently moving the display rods or trays whereby certain of them remain in view in a predetermined fixed position for a given length of time and are then shifted out of sight, while a new set of rods or trays are moved into sight.

Another object of the invention is to provide simple and efficient mechanism for intermittently moving the article supporting members and intermittently concealing said members and moving them to an out-of-the-way position while a new set is being shifted into view.

Still another object of the invention is to provide a display apparatus having intermittently shifted article supporting members and intermittently shifted signs adapted to bear indicia descriptive of the article upon the article holders or indicating the price thereof.

Broadly speaking, the invention comprises a window display apparatus consisting of intermittently shifted trays or rods and associated signs upon which may be shown the price of the goods, and suitable legends describing the same. Associated with this intermittent mechanism is a curtain shifting mechanism which moves the curtain to cut off the view while the trays or article supporting rods are being moved, after which the curtain is again shifted to display the new devices.

Further objects of the invention will appear as the following description is read in connection with the accompanying drawing, which forms a part of this application, and in which:—

Figure 1 is a perspective view showing one form of the display apparatus arranged in a window and occupying the entire display space therein. Fig. 2 is a similar view of the device removed and with parts broken away. Fig. 3 is a central, transverse sectional view. Fig. 4 is a vertical sectional view through the machine taken on the line 4—4 of Fig. 3. Fig. 5 is an enlarged detail end elevation with the end plates removed. Fig. 6 is a detail end elevation with parts broken away to show the intermittent curtain moving and shifting mechanism. Fig. 7 is an enlarged detail sectional view showing the construction of the end members with trays mounted therein. Fig. 8 is a similar view showing the board supporting rods. Fig. 9 is a perspective view of one of the trays. Fig. 10 is a perspective view with parts broken away showing a modified form.

As shown in Fig. 1, the device is arranged with an ordinary bay-window 1 and occupies the entire display space therein, being preferably so arranged with respect to the floor of the bay-window that a considerable portion of the apparatus is arranged below the floor so as to conceal the motor connection.

The device consists essentially of a pair of end members 2 and 3 each constructed of separate plates 4 and 5 held in separated relation by the front plate 6, bottom 7 and the rear plate 8.

The plates 4 and 5 have journaled therein suitable shafts 9 arranged as shown in dotted lines in Fig. 4 upon which are secured sprocket wheels 10 to guide the sprocket chains 11 which travel thereover. Each sprocket chain is provided at suitable intervals with a link connecting screw 12 having a head 13 on one side adapted to fit within a groove 14 formed in the plate 4. The opposite end of the screw has mounted thereon a nut 15 into which a tray attaching screw 16 or the board supporting rod 17 is adapted to be threaded. The screws 16 of opposite chains support a tray 18 between the end members, which tray is provided with lateral studs 19 having anti-friction rollers arranged to engage slots 20 which run parallel to the slots 14 in which the bolt 12 is adapted to move. The nuts 15 are also adapted to form a support for the opposite ends of the board supporting rod 17 upon which a card holding board 23 is mounted. This board is provided with lateral studs 24 arranged to engage the channels 20 and in both instances the studs 19 or 24 serve to hold the trays or rods from turning. The upright member 26 of each tray is provided with a screw engaging hook 27 so that the trays are made readily removable when desired.

Projecting outwardly from the opposite end members and arranged between the same and the outer end plate are casings 28 which have a plurality of transverse shafts 29, 30, 31 and 32 and also an extension 33 of one of the shafts 9. Each one of these shafts has suitable drums 34 secured thereto with sprocket wheels 35 adjacent their ends adapted to engage the sprocket chain 36 removably connected to the continuous belt 37 by the hooks 38, the latter elements removably engaging the links of the chain. These belts are adapted to contain suitable indicia which alines with the trays or rods across the machine and are viewed through sight openings 39 formed in the upper portions of the casings 28 which are flush with the upper inclined edges of the end members 2 and 3.

Projecting above the device and covered by the rear plate 8 is an auxiliary casing 15$^a$ having a glass-covered sight opening 16$^a$ through which a continuous belt 17$^a$ is exposed. This belt travels over rollers 18$^a$ and may be operated by hand or connected in any suitable manner to the chains 11 or shaft 9. If desirable, I may insert electric lights 65 between the stretches of all three signs so that they may be illuminated at night.

It will be noticed that this sign as well as the signs which have been described hereinbefore are removable from the chains 36 by simply disengaging the hooks 38, as will be readily understood.

A shaft 39$^a$ extends through the end member at one side of the apparatus and has secured thereto a mutilated gear 40 arranged to mesh with a mutilated segment 41 keyed to the driving shaft 42 which is journaled in the end plate and end member 3. The shaft 39$^a$ also projects from the opposite end of the machine and both projecting ends carry pulleys 42' which are connected by means of cables 43 to the lower edge of a curtain 44 mounted upon an ordinary spring roller 45 journaled in bearings in the upper part of the window 1. The roller 44 is of usual shade roller construction with the exception that the ratchet wheel and dogs are omitted. The gear 40 and segment 41 have coöperating, smooth portions 46 and 47 adapted to work against each other so as to lock the shaft 39$^a$ against rotation with the curtain in concealing position while the trays or rods are being shifted to bring a new display into view. The segment carried by the shaft 42 is provided with a cam shoulder 48 arranged to engage and guide into engagement with the rib 48$^a$ shown by dotted lines in Fig. 6, a lateral projecting stud 49 upon a spring pressed brake pin 50 arranged to engage a notch 51 formed in the periphery of the wheel 52 carried by the projecting end of one of the shafts 9. This shaft 9 also carries a gear 53 arranged to engage a toothed edge 54 of the segment, which toothed edge is arranged in a higher plane than the segment 41 and terminates short of the end of the smooth portion 47. It will be seen that as the segment 41 rotates it will engage the gear 40 and rotate the wheels on both ends of the shaft 39$^a$ until the smooth portion 46 comes into contact with the smooth portion 47. This turning of the pulleys 42' winds up the cables 43 and draws down upon the shade 44 against the tension of the spring in the roller 45. Immediately after the segment 41 has been disengaged from the gear 40 the cam 48 releases the locking pin 50 from the notch 51 and the segment 54 engages the gear 53 and rotates the shaft 9, thus turning both of the chains 11 and shifting the trays or rods so as to bring another set of articles into displaying position. When the stud 49 is released by the shoulder 48 the pin will again be projected against the wheel so that as the segment 54 disengages from the gear 53 the pin will simultaneously be extended into the notch and lock the shafts 9 against movement. Immediately subsequent to this action the smooth portion 46 of the mutilated gear 40 slips off of the smooth portion 47 of the segment 41 and the spring in the roller 44 raises the curtain and returns the gears 40 to their normal position ready to be operated upon again when the shaft 42 makes its next revolution.

In the modification shown in Fig. 10 the machine is constructed similarly to the machine shown in Fig. 1 with the exception that the signs are omitted and only one tray or rod is exposed at a time. The end members corresponding to numbers 2 and 3 and indicated at 54 and 55 are constructed in a similar manner and have removably arranged therebetween the trays 56 hung upon the screws connected to the operating chains 57 in a similar manner to that shown in Fig. 7. The end members are held together by the front plate 58 having a sight opening 59 through which the goods are displayed upon the trays and by the top and rear plates 60, as shown. The intermittent operation of the trays is obtained in a similar manner to that just described, while the curtain travels over rollers 61 mounted above the path of the tray between the end members and has secured to its end a weight 62 which acts in place of a spring roller to raise the curtain after the smooth portion of the mutilated gear 40 has slipped off the smooth portion 47 of the segment.

The timing of the parts is so arranged that the trays will pass beneath the weight after the same has been raised by the lowering of the curtain while the goods on the tray is exposed between the cables which operate the curtain. In this instance only one tray is exposed at a time through the opening 59 and, therefore, the speed of the motor is reduced by connecting the same to a worm shaft 63 which meshes with the worm wheel 64 upon the driving shaft identical with the shaft 42.

As shown in Fig. 2, and other similar figures, the slots 20 and 21 are so arranged that at certain times the studs 19 and the nuts 15 travel in the same plane, while at other times they travel in parallel planes when turning corners. It will also be noticed that certain of the vertical slots are arranged in between others so as to make as long a path for the trays or rods as is possible and so that as many articles may be displayed as is possible with the size of the machine.

In the operation of the machine the motor (not shown) which is connected with the shaft 42 in any suitable manner is started and as the tooth edge 41 of the segment on the shaft comes into engagement with the gear 40, said gear is rotated until the smooth portion 46 engages the smooth portion 47 of the segment. The rotation of the gear 40 turns the shaft 39ª and causes a winding of the cables 43 upon the pulleys 42'. This draws the curtain 44 down in front of the apparatus and conceals the change which subsequently takes place. This change is affected by the shoulder 48 engaging the stud 49 and releasing the spring pressed pin from the wheel 52. The toothed surface 54 is then brought into engagement with the gear 53 and the shaft upon which this gear is rotated. This action rotates both of the chains 11 and shifts the trays or board holding rods so that another set will be displayed when the curtain is raised. Simultaneously with the disengagement of the gear 53 by the toothed edge 54 the stud is disengaged by the shoulder 48 and the pin thrown to locking position. The smooth portion 46 of the mutilated gear 40 also drops off of the smooth portion 46 and the spring of the roller 45 returns the curtain and the gear 40 to normal position ready for a second operation.

As before stated, the operation of the structure shown in Fig. 10 is identically similar with that just described with the exception that only one tray is exposed at a time through the opening 59.

What is claimed is:—

1. In combination, display members, a continuously driven shaft, two sectors secured to said shaft, means coöperating with said sectors for intermittently shifting sets of said members into viewing position, means for concealing said members during said shifting, means for restoring the concealing means to normal position automatically after a new set of members has been shifted into viewing position, and means operated by one of said sectors for automatically locking said displaying members against movement when the concealing means has been restored to normal position.

2. In combination, display members, a continuously driven shaft, a pair of sectors secured thereto and one being mutilated, means coöperating with the mutilated sector for concealing said members at spaced intervals, and means independent of said first means and coöperating with the other of said sectors for moving said members between the mentioned intervals.

3. In combination, display members, a continuously driven shaft, a pair of sectors secured thereto and one being mutilated, means coöperating with the mutilated sector for concealing said members at spaced intervals, and means independent of said first means and coöperating with the other of said sectors for moving said members between the mentioned intervals, and a brake holding said second means against movement during the movement of said first means.

4. In combination, display members, a continuously driven shaft, a pair of sectors secured thereto and one being mutilated, means coöperating with the mutilated sector for concealing said members at spaced intervals, and means independent of said first means and coöperating with the other of said sectors for moving said members between the mentioned intervals, and a brake holding said second means against movement during the movement of said first means, and means carried by said mutilated sector for operating said brake.

5. In combination, display members, a continuously driven shaft, a pair of sectors secured thereto and one being mutilated, means coöperating with the mutilated sector for concealing said member at spaced intervals, and means independent of said first means and coöperating with the other of said sectors for moving said members between the mentioned intervals, and a brake holding said second means against movement during the movement of said first means, and means carried by said mutilated sector for operating said brake, said mutilated sector being so shaped as to throw said brake to an inoperative position prior to said second means engaging its associated sector.

In testimony whereof I affix my signature in presence of two witnesses.

OTTO A. KLINGELHOFER.

Witnesses:
ARTHUR M. HAMMANN,
STANLEY MAISEL.

Copies of this patent may be obtained for five cents each, by addressing the "Commissioner of Patents, Washington, D. C."